United States Patent [19]

Nishikawa et al.

[11] Patent Number: 5,095,504
[45] Date of Patent: Mar. 10, 1992

[54] TELEPHONE AND TELEPHONE SYSTEM HAVING TEMPORARY TRANSFER AND HOLD-RELEASE FUNCTIONS

[75] Inventors: Shigeru Nishikawa; Shugoro Ueno, both of Tokyo; Michihiro Izumi, Yokohama, all of Japan

[73] Assignee: Canon Kabushiki Kaisha, Tokyo, Japan

[21] Appl. No.: 250,222

[22] Filed: Sep. 28, 1988

[30] Foreign Application Priority Data

Oct. 1, 1987 [JP] Japan ................. 62-245826
Oct. 1, 1987 [JP] Japan ................. 62-245828
Jan. 29, 1988 [JP] Japan ................. 63-017410

[51] Int. Cl.$^5$ ............................................ H04M 1/00
[52] U.S. Cl. ................... 379/162; 379/163; 379/201; 379/212; 379/393
[58] Field of Search ............... 379/156, 157, 162–164, 379/201, 212, 215, 393, 396

[56] References Cited

U.S. PATENT DOCUMENTS

| | | | |
|---|---|---|---|
| 3,963,873 | 6/1976 | Pommerening et al. | 379/212 |
| 4,022,983 | 5/1977 | Braun et al. | 379/201 |
| 4,169,216 | 9/1979 | Overdulve et al. | 379/156 |
| 4,206,323 | 6/1980 | Padgett et al. | 379/386 |
| 4,228,324 | 10/1980 | Rasmussen et al. | 379/163 |
| 4,273,965 | 6/1981 | Cowpland et al. | 379/283 |
| 4,425,479 | 1/1984 | Dubner et al. | 379/163 |
| 4,803,718 | 2/1989 | Neil et al. | 379/393 |
| 4,852,158 | 7/1989 | Tsurusaki et al. | 379/162 |

FOREIGN PATENT DOCUMENTS

| | | | |
|---|---|---|---|
| 0079410 | 7/1978 | Japan | 379/393 |
| 0162397 | 8/1985 | Japan | 379/201 |
| 0077737 | 4/1987 | Japan | 379/393 |
| 0104598 | 5/1988 | Japan | 379/162 |

OTHER PUBLICATIONS

W. C. Dersch, "Voiced Sound Detector", 8/1962, IBM Technical Disclosure Bulletin, vol. 5, No. 3.

Primary Examiner—Jin F. Ng
Assistant Examiner—Wing F. Chan
Attorney, Agent, or Firm—Fitzpatrick, Cella, Harper & Scinto

[57] ABSTRACT

In a telephone system for performing channel control among telephones connected to a plurality of telephone lines, a call during a conversation between first and second telephones is placed on hold by a hold request from, say, the second telephone, and the call is capable of being transferred to a third telephone. It is also possible for the holding first telephone to instruct that the holding state be cancelled during the call transfer processing. When such a hold cancellation input from the first telephone is detected, the second telephone that requested the hold is so notified by an alarm. If the first telephone is subsequently hung up, the holding call is released and the connecting line of the first telephone is opened. When the second telephone cancels the holding state, the holding call is released and communication between the first and second telephones is restored. It is also arranged so that the holding first telephone can cause a message to be outputted from the second telephone that initiated the hold, thereby informing the second telephone of a desire to have the holding state cancelled. Thus, whereas a holding telephone is incapable of cancelling the holding state in the prior art, the foregoing arrangement makes it possible for the holding telephone to instruct cancellation of the holding state and to send a prescribed message to the telephone that initiated the hold.

9 Claims, 11 Drawing Sheets

TELEPHONE AND TELEPHONE SYSTEM HAVING TEMPORARY TRANSFER AND HOLD-RELEASE FUNCTIONS

BACKGROUND OF THE INVENTION

This invention relates to a telephone system having a telephone transfer function. The invention also relates to a telephone having a temporary holding function in which, when a party to a conversation is put on hold, the party is capable of sending a message to the party which initiated the hold or of cancelling the holding state.

In a telephone transfer function of a conventional telephone system, a channel is formed between a first telephone and a second telephone and, during a conversation between the two telephones, one of the telephones, say the first telephone, issues an instruction to put the call on hold, places a call to a third telephone, waits for a response from the third telephone and, when a response is received, connects the second telephone, which has not input a transfer instruction, to the responding third telephone, thereby transferring the held call to the third telephone. Since the second telephone is in the holding state once processing for the transfer starts, it is incapable of taking any action whatsoever until transfer processing ends.

Specifically, in a telephone exchange system shown in FIG. 13, when a conversing party using a telephone A 1 requests of a conversing party using a telephone B 2 that the connected call be transferred to a telephone C 3 during a conversation between the telephones A 1 and B 2, an exchange unit 30 places the call between the telephones A 1 and B 2 on hold, subsequently executes call processing for placing a call from telephone B 2 to telephone C 3 and, when telephone C 3 responds, connects telephone A 1 and telephone C 3 to transfer the held call.

In the above arrangement, no means are provided for allowing the party of telephone A 1 that requested the transfer to contact telephone B 2 during the transfer operation between telephone B 2 and telephone C 3. This is disadvantageous for the following reason: If party A requesting the call should urgently need to get in touch with party B, as in a case where party C which is the destination of the transfer suddenly shows up in person at the location of party A, it is necessary for party A to wait until the transfer to party C is completed or until party B is reconnected with party A.

A long period of time is often required for the transfer and call between parties B and C. In such case, all three parties, namely party A requesting the transfer, party B and party C waste time. This is also a cause of line crowding. Thus, once a call has been put on hold in a conventional telephone, the holding state cannot be cancelled unless this is instructed on the side that initiated the hold, and the side that has been put on hold is entirely incapable of sending and receiving messages. In the prior-art arrangement, therefore, the party put on hold is constrained to wait one-sidedly without knowing for how long.

In other words, when a party is put on hold by a telephone having a holding function, the cancellation of the holding state depends entirely on the side that initiated the hold, so that the holding side does not know how long the holding state will last and must wait until this state is cancelled, during which time the holding side can take no action. This is extremely inconvenient. Even if the holding side wishes to have the other party cancel the holding state, there is absolutely no way in which the other party can be so informed. The only recourse to escape from the holding state is for the holding side to hang up, thereby cutting off the line being held and, in effect, terminating the call.

SUMMARY OF THE INVENTION

An object of the present invention is to solve the aforementioned problems encountered in the prior art. In accordance with the invention, the foregoing object is attained by providing a telephone system for performing channel control among telephones connected to a plurality of telephone lines, comprising transfer means for transferring a call between first and second telephones to a third telephone in accordance with a transfer instruction from the second telephone during a conversation between the first and second telephones, alarm means for alarming the second telephone of transfer suspension when there is a transfer suspension input from the first telephone during transfer processing by the transfer means, and releasing means for releasing a connecting line of the first telephone in response to hanging up of the first telephone upon passage of a predetermined period of time following the alarm from the alarm means.

In the arrangement of the invention described above, the connected (first) telephone is provided with a transfer suspending key for causing a warning indicating a desire to suspend transfer to interrupt the party making the transfer, and a return key for reconnecting the party making the transfer to the party that requested the transfer. Thus, the party that requested the transfer can inform the party making the transfer of his desire to suspend the transfer.

In another aspect of the invention, there is provided a telephone system for performing channel control among telephones connected to a plurality of telephone lines, comprising hold control means for putting a call on hold in response to an instruction input from a first telephone having built-in audio output means, detecting means for detecting a specific instruction input signal from a second telephone put on hold by the hold control means, and actuating means for actuating the audio output means of the first telephone when the specific instruction input signal is detected by the detecting means.

With this arrangement, it is possible for a message to be outputted from the audio output means of the first telephone, which initiated the holding state, by the specific instruction input signal from the holding second telephone.

In accordance with the invention, the telephone system further comprises comparing means for comparing a received signal level from a connected line in the holding state with a specific threshold value level, and alarm means for issuing an alarm when the comparing means senses that the received signal level is higher than the specific threshold value level. This makes it possible for the holding side to transmit a hold cancellation request.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described in detail with reference to the drawings.

First Embodiment

Figure 1:
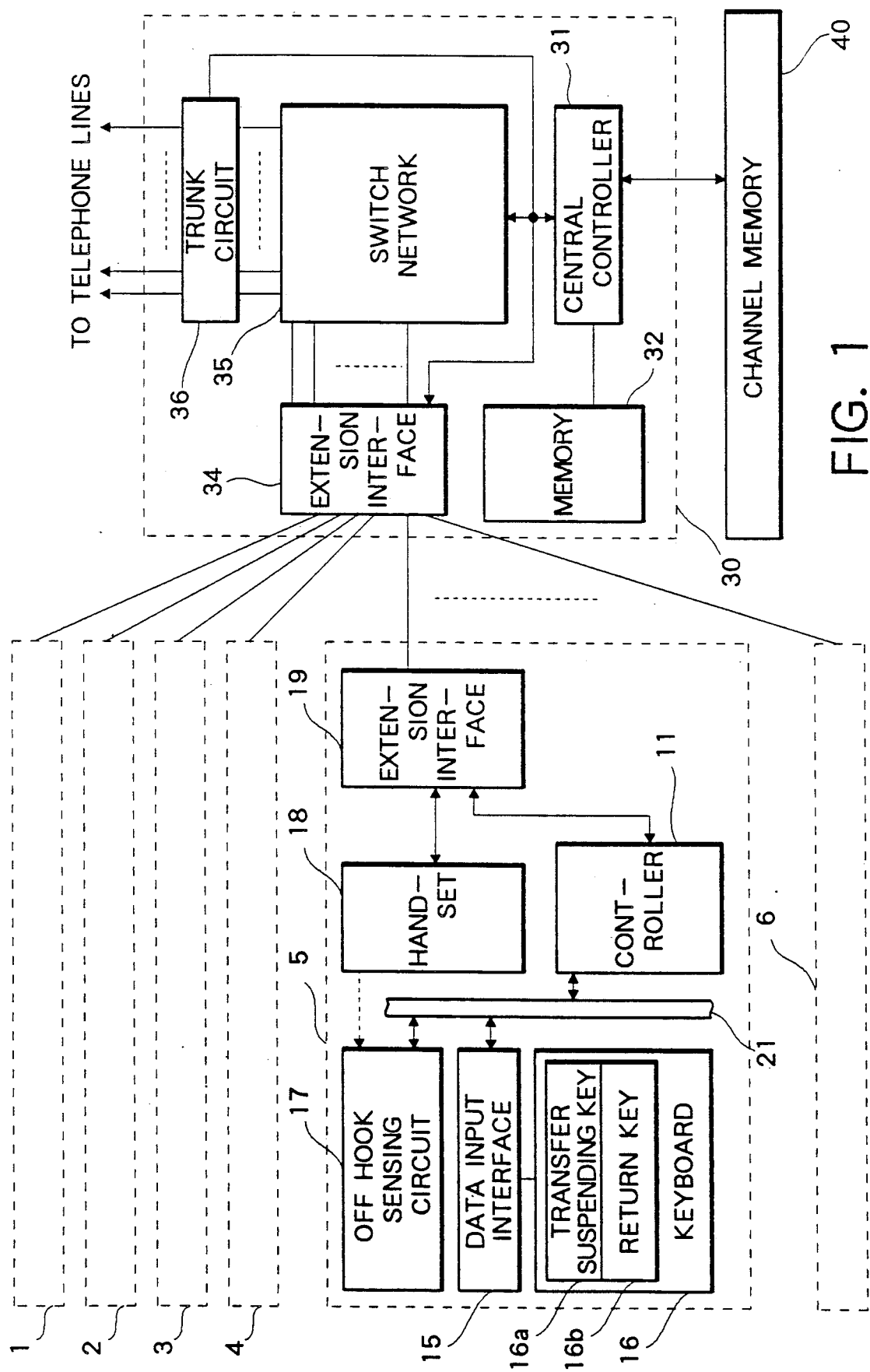
FIG. 1 is a block diagram of a first embodiment of the present invention.

FIG. 1 illustrates the construction of a telephone system embodying the present invention. The system includes extension telephones 1 through 6 connected to extensions incorporated in an exchange unit 30, and the exchange unit 30 for executing line connection control between a plurality of central office lines (outside telephone lines) and a number of connected extension telephones, connection control among the extension telephones, and transfer control, which will be described hereinbelow.

Since the telephones 1 through 6 are identical in construction, only telephone 5 will be described as a typical example.

The telephone 5 includes a controller 11 for executing overall control of the telephone of this embodiment. A data input interface 15 for interfacing a keyboard 16, the keyboard 16, which comprises a ten-key pad for inputting telephone numbers as well as a transfer suspending key 16a and a return key 16b, an off-hook sensing circuit 17 for sensing whether a handset 18 is on or off the hook, the handset 18, an extension interface 19 for interfacing the handset 18 and the exchange unit 30, and an internal bus 21 for connecting the controller 11 with the other components.

Figure 5:
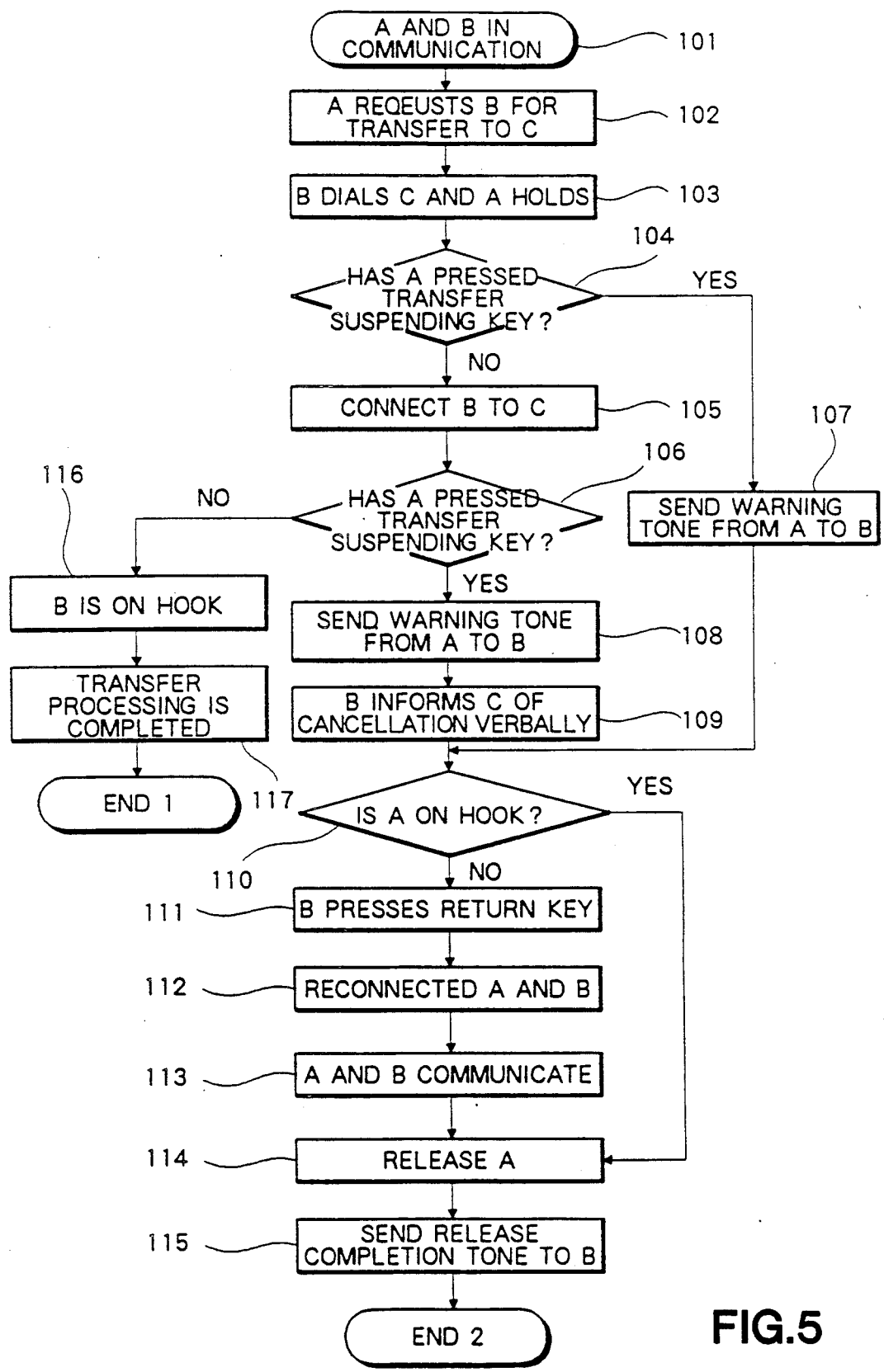
FIG. 5 is a control flowchart showing telephone transfer processing according to the present embodiment.

The exchange unit 30 includes a central controller 31 for executing overall control of the exchange unit in accordance with a program, such as shown in FIG. 5, stored in a memory 32, the memory 32 which, in addition the abovementioned program, stores various parameters and various control data, an extension interface 34 for interfacing each connected extension telephone, a switch network 35 for effecting connection/changeover of the channels between the outside telephone lines (pay stations) and the telephone connecting lines, and a trunk circuit 36 for interfacing the outside telephone lines.

Numeral 40 denotes a channel memory for storing the channel control status of the switch network 35. The channel memory 40 includes a write memory section for the switch network and a read memory section for the switch network, as will be described below.

Figures 2, 3:
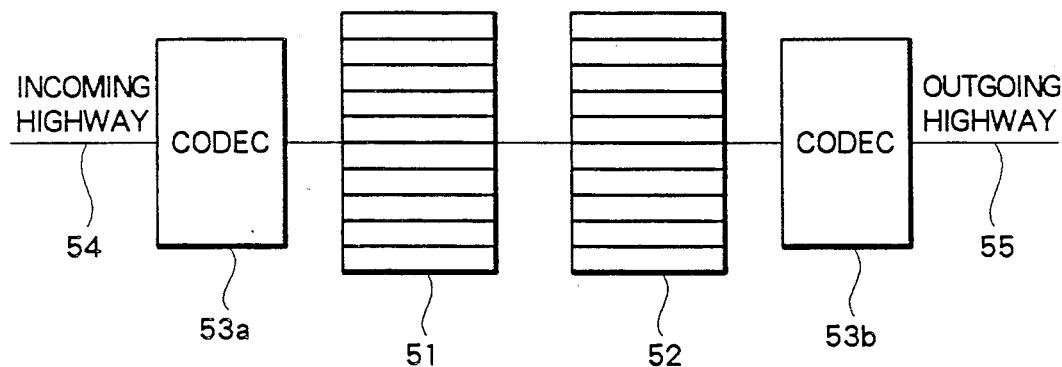
FIG. 2 is a schematic view of exchange switches in a switch network according to the invention.
FIG. 3 is a view showing the constitution of a write memory shown in FIG. 2.
Figure 4:
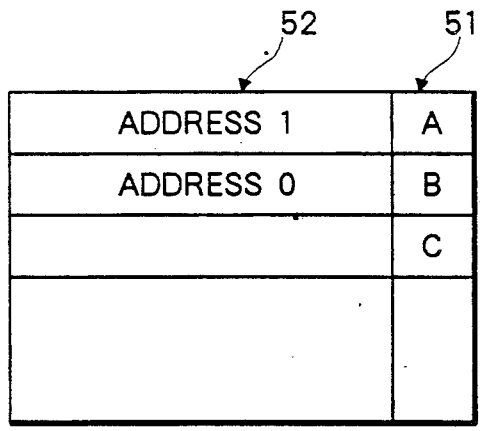
FIGS. 4(A) through (E) are views showing the transition of states in a read memory in transfer processing according to the present embodiment.
Figure 4:
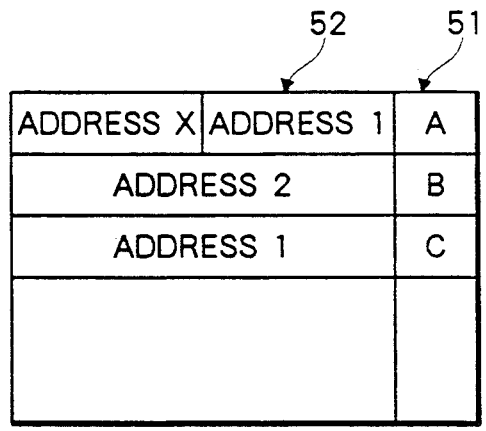
Figure 4:
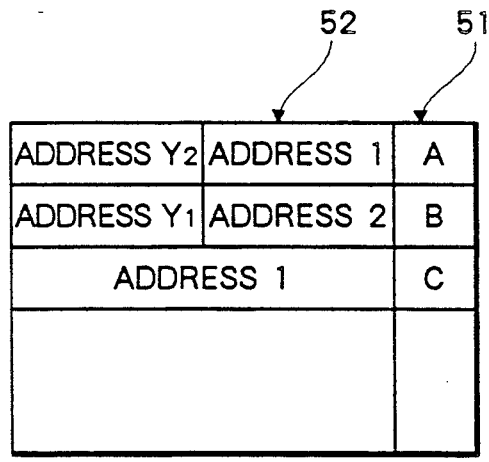
Figure 4:
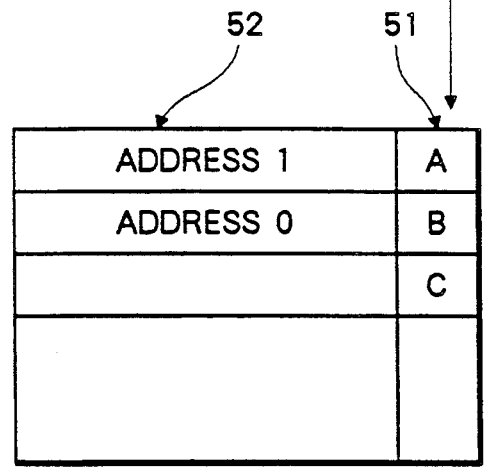
Figure 4:
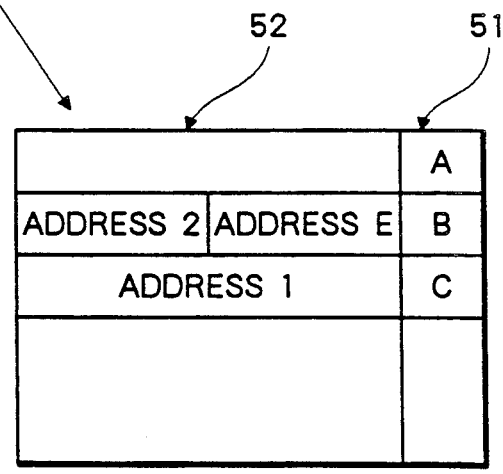

Channel exchange control by control of the switches in the switch network 35 is performed in accordance with the contents stored in the channel memory 40. FIG. 2 illustrates an example of an exchange switch arrangement in the switch network 35.

The arrangement of FIG. 2 includes an incoming highway 54, a write memory 51, a read memory 52, an outgoing highway 55 and CODEC's 53a, 53b, multiplex signal transmitted on the incoming highway 54 is distributed over time slots by the CODEC 53a, and an address name is set for each of these time slots, as depicted in FIG. 3. Thus, the required address data is accepted in the write memory 51 and read memory 52 of FIG. 2, and the data is multiplexed by the CODEC 53b and sent out to the outgoing highway 55.

FIG. 3 illustrates the storage format of the write memory 51, in which numeral 41 denotes input data name, 42 an address portion and 43 a data portion having a capacity of eight bits.

The addresses (0, 1, 2, 3, . . . ) have one-to-one correspondence with the telephones (the connecting lines thereof) 1, 2, 3, 4, . . . , the data at address (0) corresponds to telephone 1, the data at address (1) corresponds to telephone 2, the data at address (2) corresponds to telephone 3, and so on.

Data indicative of a PBX hold tone, a transfer suspension tone, a transfer suspension ring-back tone, a return signal and a release completion tone output destination is stored at addresses (X), (Y1), (Y2), (Z) and (E), respectively.

FIGS. 4(A) through (E) illustrate storage states that correspond to the various control states in conversation transfer processing performed by controlling the switch network 35 of the read memory 52. In the description that follows, A, B and C correspond to the telephones 1, 2 and 3 and respectively indicate the party requesting transfer, the party making the transfer and the party which is the destination of the transfer. In FIG. 4, numeral 51 denotes an address portion and 52 a data portion. The addresses A, B, C, . . . have one-to-one correspondence with the telephones (the connecting lines thereof) 1, 2, 3, . . . , and the corresponding data portion 52 uniquely designated by the address portion 51 represents another party's connecting line of the particular telephone connecting line as well as various control states such as the holding state.

FIG. 4(A) illustrates an ordinary communicating state between telephones A and B. An address "1" corresponding to the telephone 2 (B) is stored in the corresponding data portion 52 of telephone 1 (A), and an address "0" corresponding to the telephone 1 (A) is stored in the corresponding data portion 52 of telephone 2 (B). It will thus be understood that telephones 1 and 2 are in a communicating state.

Next, assume a situation in which A requests of B that the call be transferred to C when A and B are in the communicating state. First, B places A's call on hold through a well-known method and starts processing for calling C. The status of the read memory 52 when B is performing the processing for calling C is as shown in FIG. 4(B). Specifically, the holding tone is outputted to the telephone 1 (A), and the address X indicative of the PBX holding tone is stored in the corresponding data portion. Address values indicating that the lines of telephones 2 and 3 are in the connected state (or that they are being called) are stored in the data portion 52 corresponding to B and C. FIG. 4(C) illustrates the status of the read memory 2 in a case where the transfer suspending key 16a of the holding telephone A is pressed under the present circumstances. In response to acceptance of the transfer suspension, the address Y2 indicating a state in which the transfer suspension ring-back tone is being transmitted is stored in time-shared multiplexed fashion in the corresponding data portion of telephone 1 (A), the transfer suspension tone indicating that transfer suspension has been designated is outputted to the corresponding data portion of telephone 2 (B), and the addresses Y2 and 2 indicating that the connecting line is connected to telephone 3 (C) are stored in this data portion.

Consequently, if telephone 3 (C) responds at this time so that a channel is formed between telephone 2 (B) and telephone 3 (C), the transfer suspension tone is issued from both of these telephones. Processing from this point onward can take either of two forms. First, if the party of telephone 2 (B) presses the return key 16b on the telephone keyboard 16 upon hearing the transfer suspension code, the read memory 52 returns to a state, shown in FIG. 4(D), that is identical with that shown in FIG. 4(A), so that the telephones 1 (A) and 2 (B) are restored to the communicating state.

Alternatively, if the handset 18 of telephone 1 (A) is hung up when the state shown in FIG. 4(C) is prevailing, the off-hook sensing circuit 17 detects this so that the read memory 52 makes a transition to the state shown in FIG. 4(E). Here the connecting line of telephone 1 (A) is released, the release completion tone is outputted to the telephone 2 (B) for a predetermined period of time, and the address 2 indicating connection to the telephone 3 and the address E indicating output of the release completion tone are stored in the data portion 52 is time-shared multiplexed fashion.

It should be noted that the address E vanishes upon elapse of a predetermined period of time, so that a channel is formed between telephone 2 (B) and telephone 3 (C) and transfer processing ends.

Control for the foregoing transfer processing will be described in detail with reference to the flowchart of FIG. 5.

When A calls B and communication between the two [FIG. 4(A)] is established at step 101, A requests of B at step 102 that the call be transferred to C, where there is a party with which A wishes to converse. This is done if, say, the party is not present at B. In response, B performs well-known holding control at step 103, so that A is placed on hold in the exchange unit 30, the extension telephone number of C is dialed and C is called, thereby establishing the state shown in FIG. 4(B). It is determined at step 104 whether A has pressed the transfer suspending key 16a during the dialing operation. If the answer is YES, the program proceeds from step 104 to step 107, at which B hears the transfer suspension warning tone superimposed on the dial ringback tone, as shown in FIG. (C). This is followed by step 110, at which it is determined whether A has hung up. If A has not hung up, the program proceeds to step 11, at which B, whose has heard the transfer suspension warning tone, presses the return key 16b. When this is done, there is a transition to the state shown in FIG. (D), which corresponds to step 112. Here A is taken off hold and A and B are reconnected to reattain the communicating state that was in effect before execution of transfer processing.

If, upon pressing the transfer suspending key 16a, A hangs up the handset 18 after the transfer suspension warning tone is outputted at step 107, the answer will be YES at step 110 and the state shown in FIG. 4(E) will be established at step 114, i.e., A is released. Then, at the next step 115, the release completion tone is outputted to B.

If A does not press the transfer suspending key 16a during dialing at step 104, the program proceeds from this step to step 105 to complete the connection between B and C. This is followed by a step 106, at which it is determined whether A presses the transfer suspension key 16a while B is searching for the sought individual at C. If A does press the transfer suspension key 16a, B hears the transfer suspension warning tone superimposed on the conversation with C at step 108. The program then proceeds to step 109, at which time B tells C, by word of mouth, of the transfer suspension. Next, if it is found at step 110 that A has not hung up, the program proceeds to step 111, at which B presses the return key to cause execution of step 112. Here the central controller 31 controls the network 35 to reconnect A and B and release C. A channel is formed between A and B at step 113, A is released at step 114, and the release completion tone is transmitted to B at step 115 so that A and B are capable of communicating. This ends the present processing.

In this embodiment, if A does not press the transfer suspension key 16a in the telephone transfer state of step 105, the program proceeds from step 106 to step 116, at which the handset 18 at B is hung up during transfer processing so that the processing of step 117 is executed to connect A and C and effect the transfer, after which the present processing is completed.

Thus, it is possible for the party requesting a transfer to transmit a transfer suspension instruction while the party which has received the request is performing the transfer This assures that the requesting party and the party making the transfer will not have their time wasted.

It should be noted that control for transmitting each of the aforementioned tones may adopt the method of a sixth embodiment, which is described below.

Second Embodiment

Figure 6:
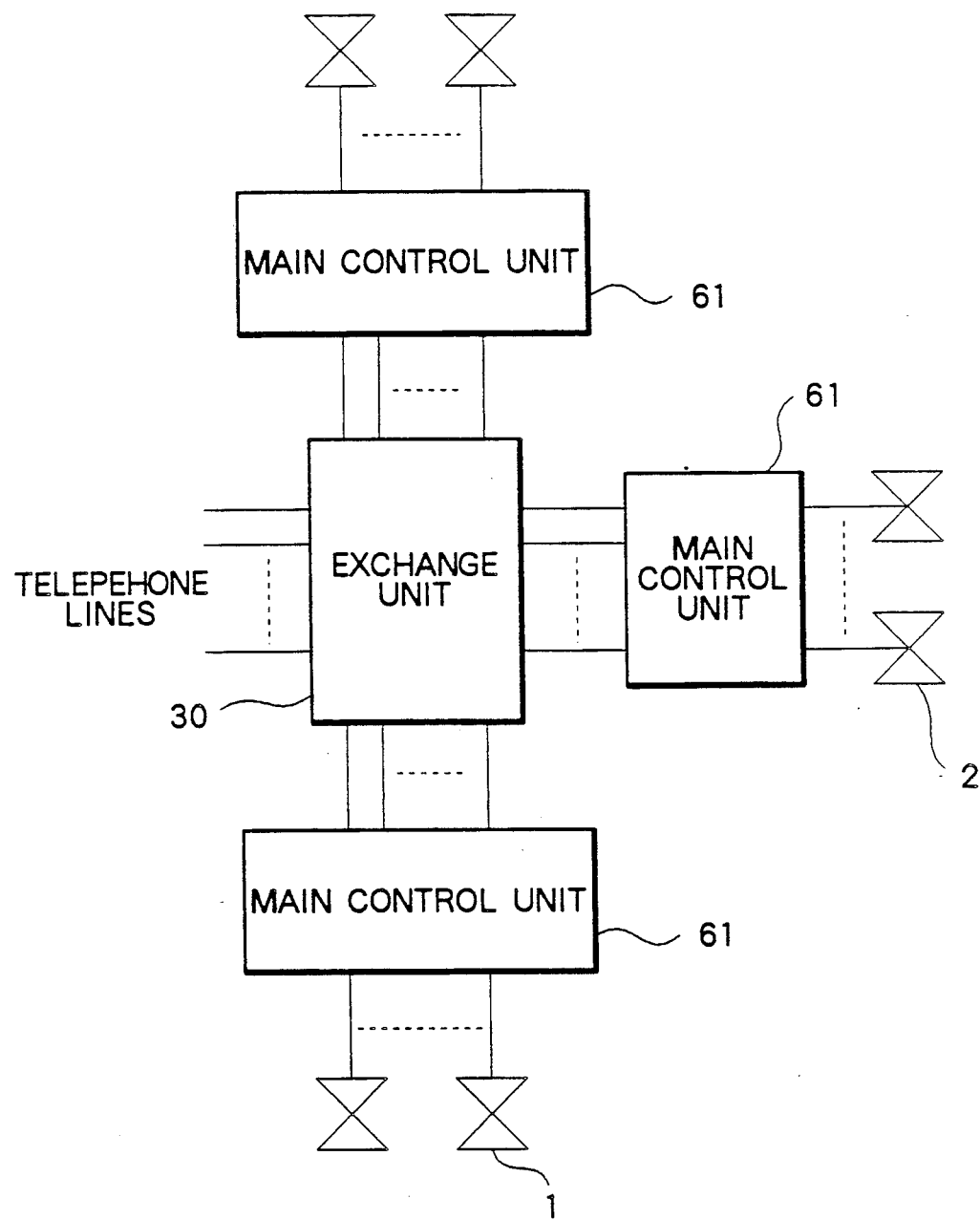
FIG. 6 is a view showing the construction of a private branch exchange system incorporating a pushbutton-type telephone system according to a second embodiment of the invention.

The description given above deals with an example in which the exchange unit 30 directly controls each of the telephones. However, the abovementioned telephone transfer suspension function is applicable even in a telephone system (a private branch exchange system incorporating pushbutton-type telephones) in which a plurality of main controllers 61 are connected to the exchange unit 30, as shown in FIG. 6. Effects similar to those described above can be obtained.

In FIG. 6, each of a plurality of pushbutton-type telephone main controllers 61 is connected to the exchange unit 30, which has a construction identical with that shown in the first embodiment. Here the exchange unit 30 accommodates the connecting lines of the main controllers 61 instead of the connecting lines of the extension telephones. The accommodated lines are subjected to control similar to that applied earlier to the extension telephones.

Third Embodiment

The issuance of the warning by pressing the transfer suspending key is not limited to an alarm produced by an acoustic signal via the handset 18 as in the first embodiment. It is possible to adopt an arrangement in which alarm means is provided for sending an output to a speaker of the terminal equipment, presenting a display on a display device consisting of a liquid crystal panel or the like on the terminal equipment or lighting a light-emitting diode lamp on the terminal equipment at the same time that the acoustic alarm is produced via the handset 18.

Fourth Embodiment

In the transmission of the transfer suspension warning signal as described in the first embodiment, the method employed is to time-share and multiplex one channel and send both the message signal and the warning signal on the same line. However, the invention is not limited to this arrangement and it is possible to adopt the method shown in FIG. 7.

Specifically, it is possible to adopt an arrangement in which one more control line is provided for transmitting and receiving various control signals such as the warning signal indicating suspension of the transfer operation, with the control signals being sent and received via this control line.

Figure 7:
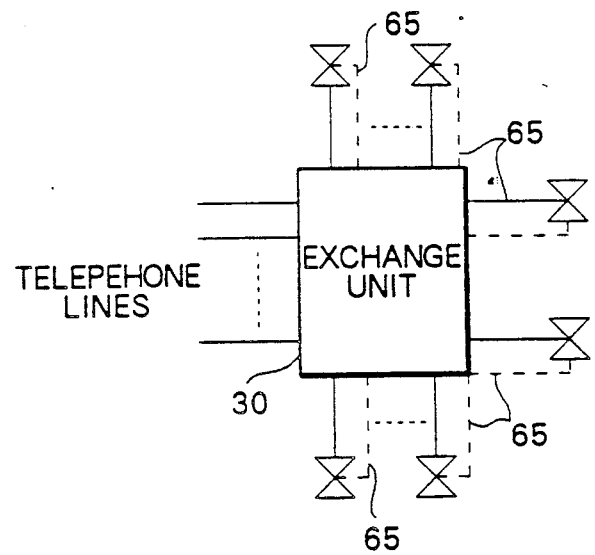
FIG. 7 is a view showing the construction of a private branch exchange system provided with control signal transmitting control lines in a fourth embodiment of the invention.
Figure 13:
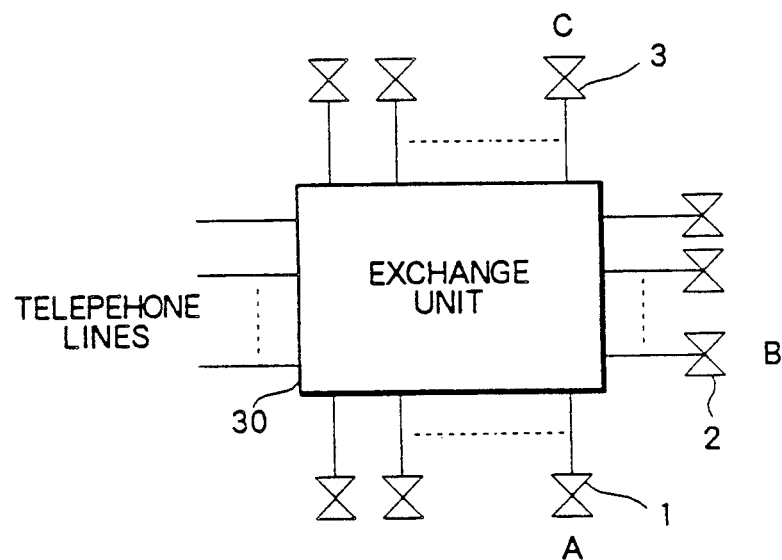
FIG. 13 is a view showing the construction of a common private branch exchange system.

In FIG. 7, numeral 65 denotes the control line, which is indicated by the dashed line.

In accordance with each of the embodiments described above, there are provided the transfer suspending key for causing a warning indicating a desire to suspend transfer to interrupt the party making the transfer, and the return key for reconnecting the party making the transfer to the party that requested the transfer, thereby assuring that the requesting party and the party making the transfer will not waste time and limiting the occurrence of line crowding.

In accordance with the embodiments, it is possible to issue an alarm during a transfer operation indicating that the transfer operation is no longer required. thereby enabling this unnecessary transfer operation to be interrupted. Accordinglyn unnecessary operation can be prevented and countermeasures can be taken immediately.

Fifth Embodiment

A fifth embodiment of the invention will now be described in detail.

Figure 8:
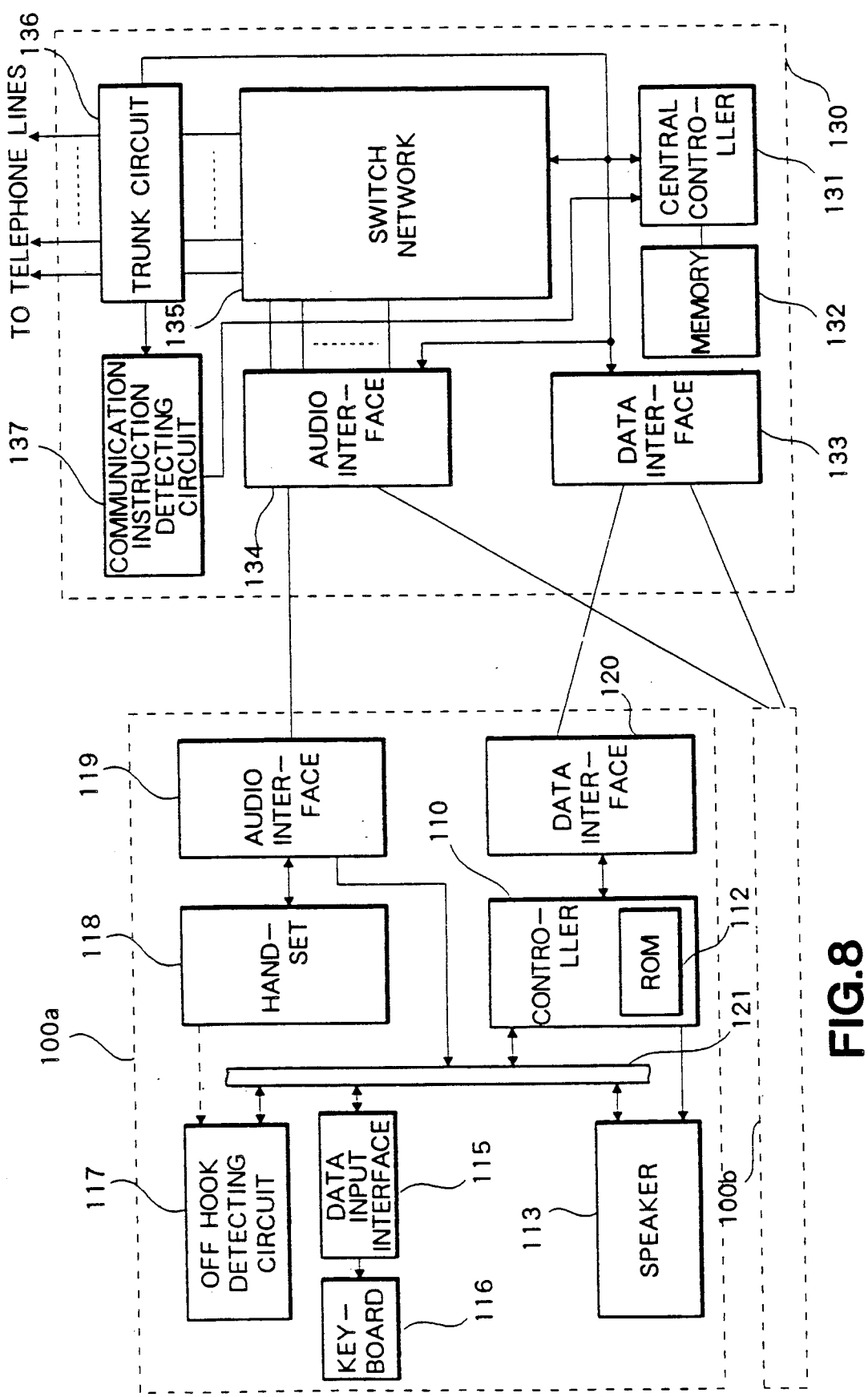
FIG. 8 is a block diagram of a fifth embodiment of the invention.

FIG. 8 is a block diagram of a fifth embodiment of the invention, in which numerals 100a. 100b denote pushbutton-type telephones and numeral 130 represents a main control unit for executing line connection control between a plurality of central office lines (outside telephone lines) and a number of connected extension pushbutton type telephones and connection control among the extension pushbutton telephones.

Since the pushbutton telephones 100a, 110b are identical in construction, only the construction of telephone 100a will be described as a typical example.

The telephone 100a includes a controller 110 for executing overall control of the telephone of this embodiment in accordance with a program stored in an internal ROM 112, the ROM 112 for storing various parameters in addition to the abovementioned program, a speaker 113 for acoustically outputting voice information received via an audio interface 119, a key input interface 115 for interfacing a keyboard 116, the keyboard 116, which comprises function keys including telephone number keys for inputting telephone numbers as well as a hold communication key, described below, an off-hook sensing circuit 117 for sensing whether a handset 118 is on or off the hook, the handset 118, the audio interface 119 for interfacing the handset 118 and the main control unit 130, and an internal bus 121 for connecting the controller 110 with the other components.

The exchange unit 130 includes a central controller 131 for executing overall control, a memory 132 which, in addition to the abovementioned program, stores various parameters as well as various control data for each of the extension pushbutton telephones, a data interface 133 which administers interfacing for transfer of digital data, which includes control information, between the pushbutton telephones, an audio interface 134 which administers interfacing for voice data transfer between the pushbutton telephones, a switch network 135 for effecting connection/changeover between the outside telephone lines (pay stations) and the telephone connecting lines, a trunk circuit 136 for interfacing the outside telephone lines, and a communication instruction detecting circuit 137 for detecting a signal, which corresponds to depression of a communication key, sent from an outside line.

Figure 9:
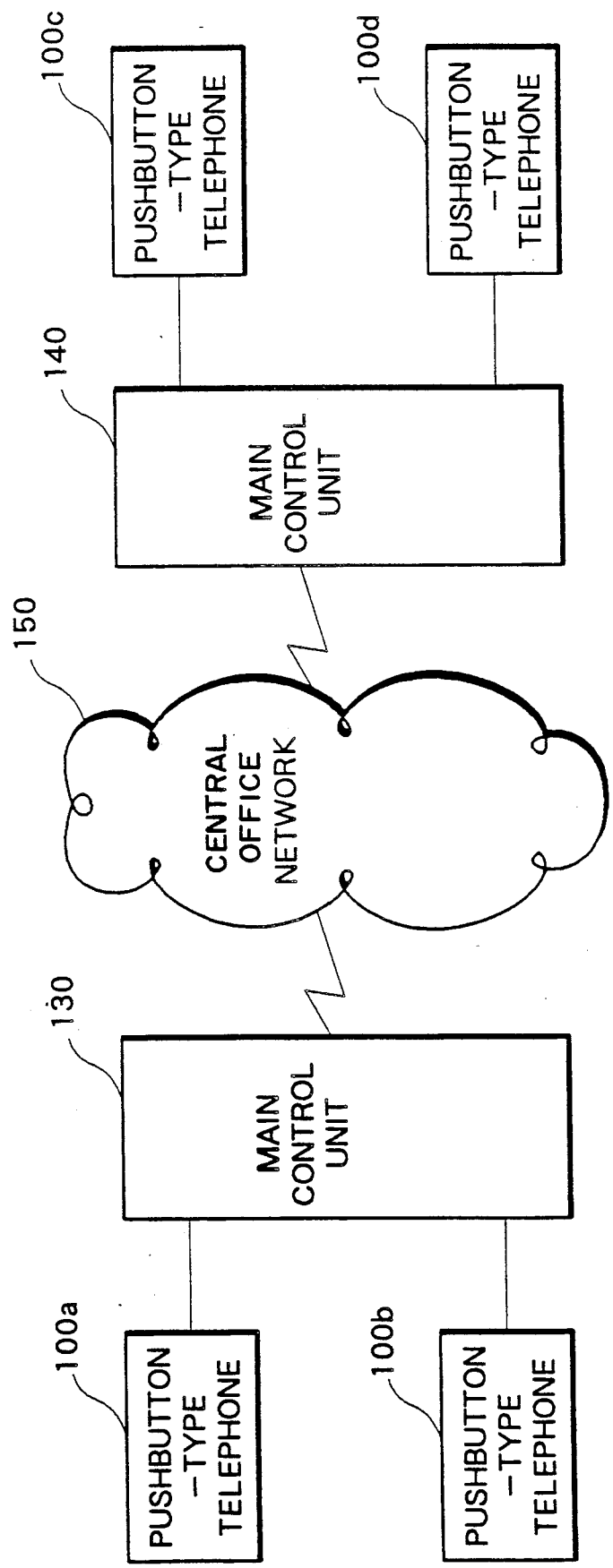
FIG. 9 is a view showing the arrangement of a telephone line network in the fifth embodiment.

The network arrangement of the fifth embodiment having the foregoing construction is shown in FIG. 9.

Pushbutton telephones (extension telephones) 100a, 100b and 100c, 100d, which have the same construction as telephone 100a in FIG. 8, are connected to main control units 130 and 140, respectively. The main control units 130, 140 are interconnected via a central office line network 150. The main control unit 140 has the same construction as the main control unit 150.

Figure 10:
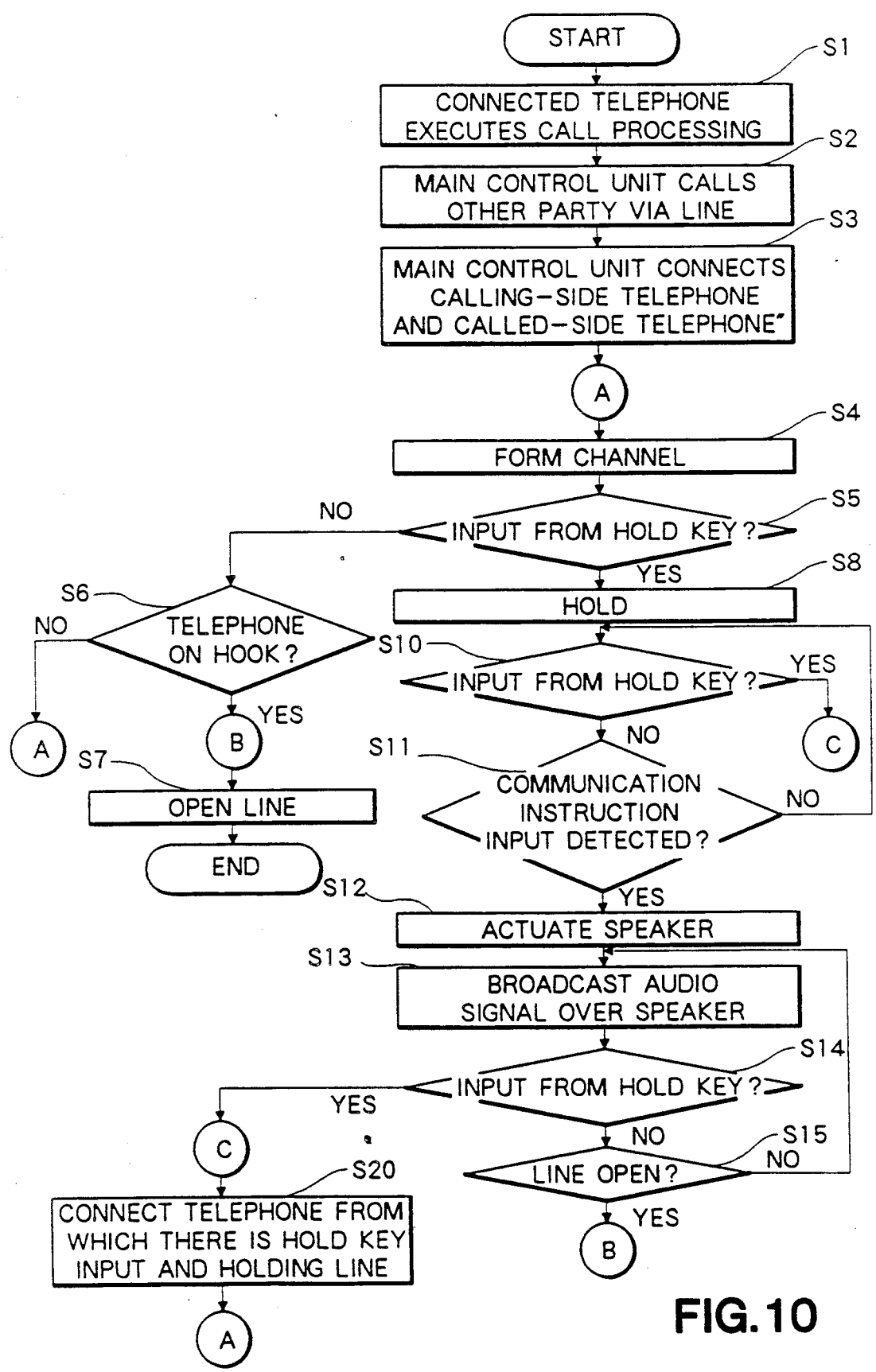
FIG. 10 is a channel control flowchart in the fifth embodiment.

Communication and holding control of this telephone system will now be described with reference to the flowchart of FIG. 10.

At step S1 the handset 118 of e.g., the pushbutton telephone 100c is taken off the hook to initiate call processing of a line in the main control unit 130. This processing is well known and need not be described in detail. Suffice it to say that when the handset 118 is taken off the hook, an open line and the telephone 100care connected to each other, after which a telephone number is entered from the keyboard 116. The entered signal is transmitted to the main control unit 140 via the data interfaces 120, 133, and a telephone number signal corresponding to the telephone number inputted via the trunk circuit 136 of the main control unit 140 is outputted on a central office line. This telephone number signal is sent to a telephone office facility, not shown. At a step S2 the facility calls the line (e.g the connecting telephone line of the main control unit 130) of the desired destination specified by the telephone number signal. Upon detecting the call, the main control unit 130 calls. e.g the extension telephone 100a.

When there is a response at the extension telephone 100a and the handset 118 of the extension telephone 100a is taken off the hook, this is sensed by the off-hook sensing circuit 117 and the controller 110 informs the data interface 133 of the main control unit of this fact via the data interface 120. The central controller 131 senses the fact that the handset is off the hook via the data interface 133 and controls the switch network 135 to connect the called line with the extension telephone 100a and form a channel between the calling telephone 100c and this telephone 100a, thereby making communication possible (step S4). Steps S5 and S6 perform monitoring to determine whether there is an input from a hold key (not shown) on the keyboard 116 and whether the handset 118 is hung up at the end of a conversation.

When a conversation ends and the handset 118 of either of the telephones is hung up, the program proceeds from step S6 to step S7, where a DC loop formed between the lines is opened to release the lines, after which processing is ended.

If there is an input from the hold key of keyboard 16 at the step S5, this is sensed by the key input interface 115 of the telephone and the main control unit side is informed of the fact via the data interface 120. The main control unit detects the fact via the data interface 133, and the program proceeds from step S5 to step S8, where the connection between the input at which the input was made and the telephone line connected during the conversation is cut, thereby placing the call on hold. When necessary, a holding tone may be sent to the other party at this time.

When an input from the hold key of, e.g., the extension telephone 100a is detected, the main control unit 130 puts the called line on hold and opens the connection to the extension telephone 100a. This status transition is preserved in memory 131. Next, steps S10 and S11 again perform monitoring to determine whether there is an input from the hold key and whether the communication designation detecting circuit 137 has detected a communication designation signal from the holding line.

The reason for this is that, in the prior art, the holding side (telephone 100c in this example) cannot take any action and must wait for an operation on the other party's side once the line has been put on hold. By contrast, this embodiment effects control so that the holding side can contact the other party under the foregoing circumstances.

Specifically, by pressing a hold interrupt key (not shown) on the keyboard 116, a predetermined voice signal can be outputted from the telephone on the holding side to the telephone that initiated the hold. In such case, pressing the hold interrupt key on the keyboard 116 of, say, telephone 100c causes a signal corresponding to this key input to be sent to the main control unit 140 via the data interface 120. The main control unit 140 converts this signal into a predetermined corresponding communication instruction signal and transmits this signal to the central office network 150, through which the signal is sent to the main control unit 130.

When the communication instruction signal arrives at the main control unit 130, it is detected by the communication instruction detecting circuit 137 of this unit and processing proceeds from step S11 to step S12. Here the central controller 131 reads the status transition out of the memory 132 and specifies the telephone that previously initiated hold (telephone 100a in this example). The telephone 100a then is designated for speaker actuation via the data interface 133 and the audio interface 119 (the voice signal line) is connected to the holding telephone line. The controller 111 of the telephone 100a which has received the speaker actuation instruction signal actuates the speaker 113 and, at step S13, effects control so that the voice signal which arrives via the audio interface 134 is received by the audio interface 119 and emerges as an audio output from the speaker 113. As a result, the party of telephone 100a is capable of readily acknowledging, via speaker 113, the release request received from the holding party.

The main control unit 130 monitors, via steps S14 and S15, whether there is an input from the hold key of the connected telephone and whether the line is opened.

If there is an input from the hold key of the telephone 100a which has heard the message or from another telephone, the program proceeds from the step S14 to step S20, at which the telephone whose hold key has been pressed is connected to a holding line to make conversation possible.

When the telephone whose hold key has been pressed is on the hook at this time, the channel is formed after telephone is taken off the hook.

If it is necessary to open the line as in a case where the other party's telephone has been in the holding state for too long, the handset is hung up to release the line. As a result, when the opening of the line (release) from this party is detected from the trunk circuit 136, the program proceeds from step S15 to step S7, thereby cancelling the holding state and releasing the line.

If there is an input from the hold key of the connected telephone when the holding state is in effect (steps S10, S11), the program proceeds to step S20.

In accordance with the embodiment described above, operating a key on the holding side makes it possible to send a message to the side that initiated the hold. Thus, the holding party need no longer wait one-sidedly.

It should be noted that the communication instruction signal from the holding side can be any distinguishable signal. For example, this signal can be replaced by a predetermined DTMF signal if desired.

According to the embodiment as described above, when communication with a telephone is placed in the holding state, a message can be delivered from the speaker of the telephone that initiated the hold by a specific instruction inputted from the holding telephone, thereby eliminating a situation in which the holding side must wait for an unnecessarily long period of time. This allows the holding side to take prompt action when required.

Sixth Embodiment

In the example described above, control is effected by a digital signal if a predetermined communication instruction signal is sent to a telephone. However, the invention is not limited to this example and is applicable also to a telephone not having a digital data signal line.

A sixth embodiment in which the invention is applied to a telephone not having a digital data signal line will now be described in detail with reference to FIGS. 11 and 12.

Figure 11:
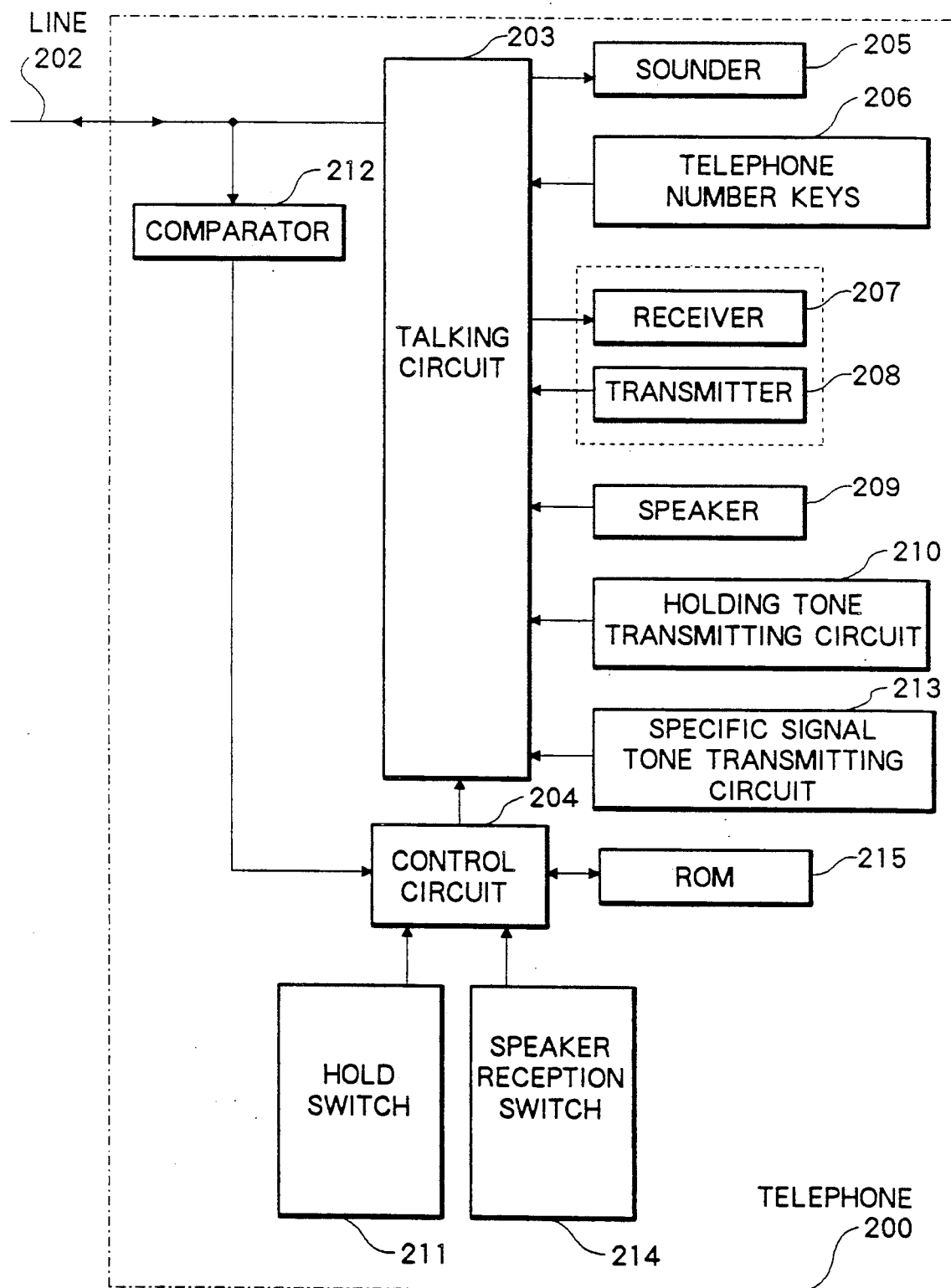
FIG. 11 is a block diagram of a sixth embodiment of the invention.
Figure 12:
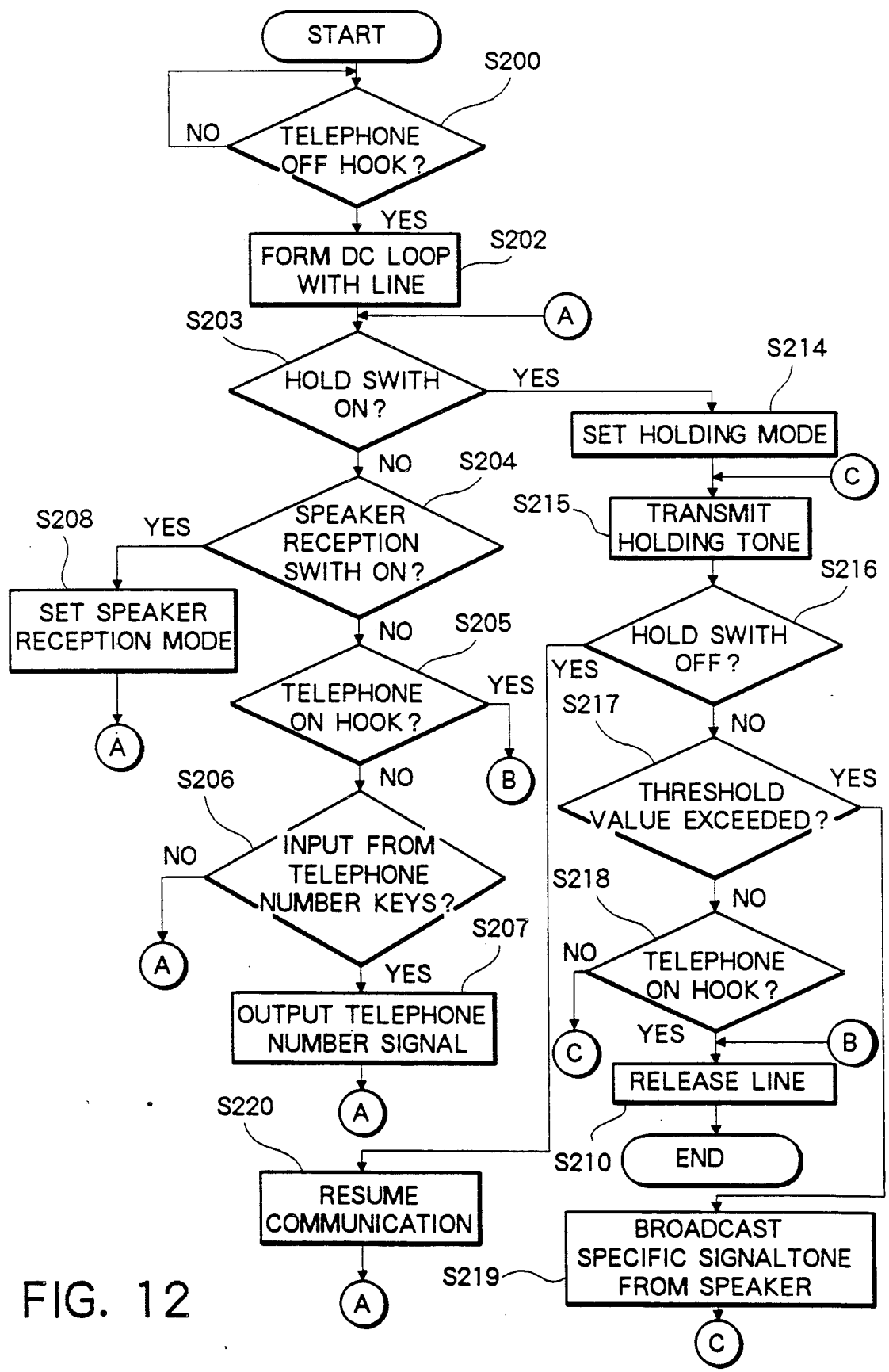
FIG. 12 is a channel control flowchart in the sixth embodiment.

FIG. 11 is a block diagram of a telephone according to a sixth embodiment of the present invention. The telephone has a main body 200 which includes a connecting line 202, a talking circuit 203 for implementing a basic talking function of the telephone, a control circuit 204 for controlling the talking circuit 203 and a comparator 212, described below, in accordance with a program shown, for example, in FIG. 12 and stored in a RCM 215, a sounder 205 serving as an electroacoustic converter for a tone ringer, telephone number keys 206 for entering a telephone number, a receiver 207 and a microphone transmitter 208. The receiver 207 and transmitter 208 are integrated to construct a handset. The telephone further includes a speaker 209 capable of acting as a voice receiver during a conversation, a holding tone transmitting circuit 210 for transmitting a holding tone to a holding side when a party is put on hold, a hold switch 211 for issuing an instruction which temporarily puts a connecting line, which is in a communicating state, on hold, a comparator 212 for comparing a received signal level from the circuit 202 with a fixed level, the comparator sending a detection signal to the telecontrol circuit 204 upon detecting that the signal level has surpassed the fixed level, and a specific tone transmitting circuit 213 which causes the speaker 209 to deliver a specific signal tone if a signal above a certain fixed level is received from the line 202 when the holding state is in effect. In this embodiment, the specific signal tone is regarded to be a hold cancellation request from the holding side. Also provided in the telephone are a speaker reception switch for changing the receiving state in such a manner that ordinary reception, which relies upon the receiver 207, is switched over to the speaker 209, and the ROM 215 storing various parameters in addition to the abovementioned program.

Communication control of the telephone according to the present embodiment having the above construction will now be described with reference to the flowchart of FIG. 12.

In this embodiment, it is arranged so that audio of a volume above a certain fixed level is transmitted when the holding side wishes to cancel the holding state. When the side that has initiated the holding state detects this volume in excess of the fixed level, this event is regarded as being a hold cancellation request. The telephone is provided with a function in which a specific signal tone is transmitted from the speaker when the audio of a volume above the fixed level is received from the holding side during the holding state. Thus, control is such that the holding side can inform the side that initiated the hold of the fact that cancellation of the holding state is requested, as opposed to the prior-art arrangement in which the side that initiated the hold is given the power one-sidedly to terminate the holding state.

First, at a step S200, it is determined whether the handset composed of the receiver 207 and transmitter 208 is lifted from the hook. In other words, the system waits for the telephone to be taken off the hook. When the telephone is taken off the hook, the program proceeds to a step S202, at which the talking circuit 203 forms a DC loop with the line 202. There are two possibilities when the telephone is taken off the hook. In one, a ring back tone issues from the speaker 209 owing to receipt of a call signal from the line 202, and the operator of the telephone responds to this tone. In the other possibility, call processing is executed.

In the first possibility where the response is made, a channel is formed with the calling side by taking the phone off the hook, thus making communication possible between the two telephones. In the second possibility where call processing is executed, the other party's telephone number is inputted to transmit the corresponding telephone number signal and call the other party.

Accordingly, it is determined at a step S203 whether there is an input from the hold switch 211, at a step S204 whether there is an input from the speaker reception switch 214, at a step S205 whether the telephone is on the hook, and at a step S106 whether there is a telephone number (dial signal) input from the telephone number keys 206. If none of these inputs is present, the program returns to step S203 and the foregoing processing is repeated until there is an input.

When there is an input from the telephone number keys 206, the program proceeds from step S206 to step S207, where the telephone number signal corresponding to the inputted telephone number is delivered to the line 202, after which the program returns to the step S203. Thus, when all digits of the other party's telephone number have been successively inputted, the telephone of the desired party is specified by the exchange unit, not shown, and this telephone is called. When the other party responds, control is such that the two parties can converse.

If there is an input from the speaker reception switch 214, the program proceeds from step S204 to step S208, where there is a changeover from an ordinary reception mode in which the received voice signal from the line is outputted from the receiver 207 to a speaker reception mode in which the received voice signal is outputted from the speaker. The program then returns to step S203. Thus, the voice signal received from the line is delivered from the speaker 209.

If an operation is necessary for outputting the voice signal from the receiver 207 again instead of from the speaker 209, it will suffice to press the speaker reception switch 214 again.

When conversation ends or when the other party is found to be busy in a case where call processing is executed, the program proceeds from step S205 to step S210 when the handset composed of the receiver 207 and transmitter 208 is taken off the hook. At step S210 the DC loop of line 202 is opened and the line is released.

If the hold switch 211 is turned on, the program proceeds from step S203 to step S214, where the line 202 is disconnected from the handset (receiver 207 and transmitter 208) and the speaker 209 and the DC loop is preserved with regard to the line 202. Next, at step S215, the holding tone transmitting circuit 210 is actuated to send the holding tone to the holding side. As a result, the holding tone is transmitted to the telephone on the holding side. Thereafter, at steps S216 through S218, it is determined whether the hold switch 211 is off (step S216), whether the result of the comparison of the reference threshold value level and the level of the signal received from line 202 performed by the comparator 212 indicates that the received signal level is above the threshold value level (step S217), and whether the handset (receiver 207 and transmitter 208) is on the hook (step 218).

If the hold switch 211 is off, the program proceeds from step S216 to step S220, where the holding tone transmitting circuit 210 is deactivated to stop the transmission of the holding tone and the line 202 is connected to the handset (receiver 207 and transmitter 208), thereby making communication possible again. The program then returns to step S203.

When the comparator 212 detects that the received signal level is above the threshold level, the program proceeds from step S217 to step S219, where the specific signal tone transmitting circuit 213 is activated to output a specific signal tone from the speaker 209, thereby informing of the fact that a holding cancellation request has been made by the holding side. The program then returns to step S215. It should be noted that the speaker delivers the specific signal tone for a fixed period of time.

If the telephone is on the hook, the program proceeds from step S218 to step S210, where line release processing is performed.

It should be noted that if the other party opens the line, the telephone 100a of this embodiment also opens the DC loop of the line in similar fashion and the program returns to step S200.

In the example described above, the telephone is provided with a holding function, but the invention is not limited to this example. Even if there are no digital data signal line and digital interface in the arrangement of the block diagram of the fifth embodiment shown in FIG. 8, it will suffice to regard as a communication instruction request a case in which a voice signal above the fixed level from the holding side is detected from the holding telephone line of the main control unit, as in the present embodiment. In such case, the communication instruction detecting circuit 137 would have the same construction as the comparator circuit 212 of FIG. 11. This will make it possible to obtain the same effects.

In accordance with the above-described embodiment, audio having a volume above a prescribed level is transmitted if the holding side wishes to cancel the holding state. As a result, the audio is detected on the side that initiated the hold and a specific signal tone is produced by the speaker on this side. Thus, the side that initiated the hold can be informed of the fact that the holding side wishes to cancel the holding state.

As many apparently widely different embodiments of the present invention can be made without departing from the spirit and scope thereof, it is to be understood that the invention is not limited to the specific embodiments thereof except as defined in the appended claims.

What is claimed is:

1. A telephone system for performing channel control among telephones connected to a plurality of telephone lines, comprising:
   transfer means for placing a call between first and second telephones on hold and then transferring the call to a third telephone in accordance with a transfer instruction from the second telephone during a conversation between the first and second telephones;
   alarm means for issuing an alarm to the second telephone of transfer suspension when there is a transfer suspension input from the first telephone during transfer processing by said transfer means, wherein said alarm means issues the alarm via a speaker of said second telephone; and
   reconnecting means for releasing a connecting line of the third telephone in response to a return input from the second telephone which has received a transfer suspension alarm from the first telephone during transfer processing, and forming a channel between the first telephone and the second telephone.

2. The system according to claim 1, wherein the transfer suspension input is reception of a signal above a predetermined level from the first telephone.

3. The system according to claim 1, further comprising releasing means for releasing a connecting line of the holding first telephone when it is detected that the first telephone has been hung up after the second telephone is alarmed of transfer suspension by said alarm means.

4. The system according to claim 1, wherein the transfer suspension input is reception of an input signal of a transfer suspension instructing key from the first telephone.

5. The system according to claim 1, wherein said alarm means issues an alarm by causing a predetermined audio signal to be outputted from the second telephone.

6. The system according to claim 1, wherein said alarm means issues an alarm by causing a predetermine display to be made by the second telephone.

7. A telephone having a function for temporarily placing a conversation on hold, comprising:
   comparing means for comparing a received signal level from a connected line in a holding state with a specific threshold level;
   hold release means for releasing the hold condition in response to manual operation in order to resume the conversation; and
   alarm means for issuing an alarm when said comparing means senses that the received signal level is higher than the specific threshold level, the alarm issued by said alarm means indicating that the held party requests a release of the hold condition;
   wherein the hold condition is released in response to manual operation after an alarm had been issued by said alarm means.

8. The telephone according to claim 7, wherein said alarm means outputs a predetermined audio signal.

9. The system according to claim 7, further comprising transfer means for placing a call between the first and second telephones on hold and then transferring the call to a third telephone in accordance with a transfer instruction from the second telephone during a conversation between the first and second telephones.

* * * * *

UNITED STATES PATENT AND TRADEMARK OFFICE
CERTIFICATE OF CORRECTION

PATENT NO. : 5,095,504
DATED : March 10, 1992
INVENTOR(S) : SHIGERU NISHIKAWA, ET AL.

It is certified that error appears in the above-identified patent and that said Letters Patent is hereby corrected as shown below:

COLUMN 4

Line 23, "53b, multiplex" should read --53b. A multiplex--.

COLUMN 5

Line 50, "is" should read --in--.

COLUMN 6

Line 7, "11, at" should read --111, at-- and "whose" should read --who--.
Line 52, "transfer" should read --transfer.--.

COLUMN 8

Line 1, "110b" should read --100b--.
Line 46, "unit 150." should read --unit 130.--.

COLUMN 9

Line 21, "keyboard 16" should read --keyboard 116--.

COLUMN 11

Line 2, "RCM 215," should read --ROM 215,--.

UNITED STATES PATENT AND TRADEMARK OFFICE
CERTIFICATE OF CORRECTION

PATENT NO. : 5,095,504

DATED : March 10, 1992

INVENTOR(S) : SHIGERU NISHIKAWA, ET AL.

It is certified that error appears in the above-identified patent and that said Letters Patent is hereby corrected as shown below:

COLUMN 14

Line 27, "predetermine" should read --predetermined--.

Signed and Sealed this

Twenty-ninth Day of June, 1993

Attest:

MICHAEL K. KIRK

Attesting Officer

Acting Commissioner of Patents and Trademarks